United States Patent Office 2,721,152

Patented Oct. 18, 1955

2,721,152

PRODUCTION OF ELECTRICAL ELEMENTS

Peter Paul Hopf, London, and Ronald Edgar John Lishmund, Reigate, England, assignors to Ward, Blenkinsop & Company, Limited, London, England, a British company No Drawing. Application November 10, 1949, Serial No. 126,701

Claims priority, application Great Britain November 12, 1948

13 Claims. (Cl. 117—212)

This invention relates to the production of printed electrical components and printed circuits.

During the past few years an increasing demand for printed circuits has arisen as their potentialities have been more fully appreciated and the methods of producing them have improved.

Several methods for producing printed circuits have been described. One is by painting the circuit on to the base material using a suitably pigmented paint: the painting may be done through a stencil. A variant thereof is to spray molten metal. Deposition of metal through a stencil as a result of simultaneously spraying separately prepared solutions of suitable reacting chemicals has also been used. Metal spattering through stencils has been proposed.

In yet another type of process a foil of metal is bonded on to the base material and after applying a resist to those parts of the metal surface in which a conductor is required the remaining metal is etched away and the resist then removed. The usual bonding material employed is a thermo-setting adhesive. A variant of this is a transfer process using a paper coated with pigment and resin, involving a hot stamping operation.

In operating any process of this character it is important to obtain a uniform product with a minimum of rejects and in most of the known processes it has been found that there are various difficulties which lead to lack of uniformity and consequently the proportion of rejects is fairly high.

According to the present invention there is provided a process for producing a printed electrical element which comprises applying to the surface of an organic electrically insulating material a pattern of an electrical conducting path as a coating, substantially free from any permanent binder, of an at least low electrically conducting material in finely divided form and thereafter simultaneously applying heat and pressure to at least the coated areas whereby the individual particles of conducting material cohere together to form said conducting path at least partially embedded in the underlying insulating material.

The starting materials employed in the present process are a finely divided form of the conductor such as finely divided silver or carbon. This is made up into a slurry in a volatile diluent to which may be added a small proportion of a less volatile organic solvent which may act as a temporary adhering agent. Examples of suitable diluents are the lower alkanols, especially methanol and ethanol, the cyclic ethers such as dioxane, the lower aliphatic ketones, such as acetone and methyl ethyl ketone, and water. In selecting the diluent regard must be had for any undesirable action, such as a swelling action, which it might have upon the surface of the insulating material. The volatile liquid is recited in the claims as "inert to the plastic," that is as exerting no chemical, swelling or other objectionable action upon the plastic. Typical examples of conductors useful in the process are finely divided silver obtained by filtering and washing the composition prepared according to the copending application Serial No. 777,116, filed September 30, 1946, and now Patent 2,592,870, finely divided copper, carbon black and colloidal graphite. Examples of less volatile organic diluents which may be present in the slurries are the lower polyhydric alcohols, such as ethylene glycol and glycerine and the amino-alcohols, such as monoethanolamine. The proportion by weight of solids in the slurry varies greatly depending upon the material. In the case of finely divided silver the proportion may be about 4 to 1 whilst with carbon black 1 to 1 is suitable.

The organic electrically insulating material may be a thermoplastic or thermoset material or it may be a high polymer. It may also be loaded with inorganic insulating materials such as asbestos, silica or glass fibres. Examples of suitable materials are electrical grades of phenol-formaldehyde and aniline-formaldehyde synthetic resins, polyacrylic resins, such as polymethyl methacrylate, polyvinyl resins, such as polystyrene and polythene. These materials may be used in a variety of forms such as sheets, films, plates and blocks. A film may be carried upon a supporting base and may be produced thereupon by coating. Such film may be more highly polymerized or condensed to the form having the most favourable electrical properties by the action of heat or actinic light. Such polymerization or condensation may be carried out at any convenient stage after coating the film. Such step may be carried out in two or more stages i. e. a partial curing prior to applying the conductor followed by a second partial curing after the conductor has been set.

In describing one form of the invention it will be assumed that it is desired to produce a printed circuit in silver upon a phenol-formaldehyde sheet material. A stencil is prepared whose cut out portions correspond to the outline of the circuit. The stencil is applied to one surface of the sheet material, which may first have had any holes that are desired punched into it. The stencil-covered surface is then sprayed with a slurry of sponge silver in methanol and the stencil then removed leaving a pattern corresponding to that of the printed circuit that it is desired to produce. The greater part of the methanol is then removed by drying, a small amount being retained for adhering the silver to the sheet. The sheet is then placed in a press which has a heated platen and the platen is then brought into contact with the surface carrying the pattern. It is preferred to apply the maximum possible pressure and to use the lowest possible temperature in this operation, and in general times of the order of 1–10 seconds are used. With a phenol-formaldehyde insulating material a pressure of about 1000 lbs./in.$^2$ at about 200° C. and a contact time of 4 seconds has been found suitable.

Instead of using a press the sheet may be passed between a pair of rollers, the one in contact with the coated surface being heated. The pressure at the nip of the rollers should be adjustable to any desired value. It is preferred to apply the maximum possible pressure and the lowest possible temperature in this operation. If desired, the coated surface can be preheated, as by radiant heat, immediately prior to passing to the rollers, but if this is done it may be necessary to displace the atmosphere in contact with the coated surface so as to prevent oxidation: nitrogen is suitable for this purpose.

With thermoset materials quite high temperatures, such as 200–250° C., and high pressures such as 1000–2000 lbs./in.$^2$ are preferred. Materials which soften on heating may be printed using a plate maintained at a much higher temperature than that at which they first soften.

When using a thermoplastic material or a material like polythene which has a definite and rather low melting point it is preferred, prior to applying heat and pressure, to interpose a thin sheet of paper which absorbs organic liquids and provides a path for the escape of vapours as well as protecting areas to which heat and pressure is not to be applied.

The pattern of the component or circuit need not be produced on the insulating material using a stencil. Other methods, such as offset printing may be used.

When a printed circuit has been produced in the manner described above the spaces that have been left for resistors can be overprinted. The procedure already described is then repeated using a second stencil whose cut-out portions correspond to the outline of the resistors. This stencil is applied, in register, to the once printed sheet and a graphite slurry then sprayed on. The cut-out portions should provide for slight overlap onto the conductors at the appropriate points in order to provide contacts. The further procedure is the same as for printing the silver circuit.

The above procedure may be modified by separately printing the outline of the contacting circuit and of one or more resistances in the circuit and the first heat and pressure step can then be omitted. It is also possible to reverse the procedure above outlined by first printing the resistors and then using a second stencil the outline of which corresponds to that of the required printed circuit.

Not only complete circuits but specific components such as coils can be printed in the manner described.

The invention can be used to produce various electrical components such as coils and resistances. Particular interest attaches to the production of resistances since these can be made so as to cut out portions of any desired resistance.

The value of a resistance may be expressed as $$R=\frac{\rho.L}{WT}$$

where R is the resistance, $\rho$ is the specific resistance of the material and L is the length, W the width and T the thickness thereof. In the prior art methods of producing coatings it has been very difficult to obtain coatings of substantially uniform and predetermined thickness and it will be appreciated from the above formula that slight variations in the value of T will considerably affect the value of R. Moreover to produce a satisfactory resistance $\rho$ and T should be constant throughout and the value of the resistance will then depend only on its length and width.

The present invention enables printing methods such as offset printing to be employed and in these substantially uniform films are employed. Thus a metal block may be prepared of the pattern of the resistance, for example, a grid system. The block is inked with the slurry based on finely divided low conducting material such as graphite, and diluent substantially free from permanent binder. The image on the block is transferred to a rubber blanket from which it is, in turn, transferred to the plastic material. The resulting films are subject to heat and pressure treatment to form the finished resistance which has a definite fixed resistance per square. Circuit lay out will usually determine the maximum length, but, by varying the width, a resistance of desired value may be cut for insertion in a circuit and fixed into position with an adhesive or by riveting.

The present process requires that the conductor be applied to the surface of the insulating material without a permanent binder being present. A small amount of higher boiling organic liquid or the residue of the volatile diluent being relied upon to maintain a sufficient adherence of the particles of the conductor to the insulating material and this is volatilised when heat and pressure are applied. In the product the particles firmly cohere to each other and at least the lower layers thereof are finely embedded in the insulating material.

The higher boiling organic liquid may be so chosen as to counteract any tendency of the conductor to undergo chemical change in the earlier stages of the process. Thus when sponge silver is used a small addition of an ethanolamine may be made to prevent oxidation to silver oxide or to reverse such change, if it has occurred, during the hot pressing. However since the reduction involved is an exothermic process it is not possible to use silver oxide per se in the coating step.

Different circuits may be printed upon the two sides of the insulating material. The second side may have an electronic shield printed thereon.

The following examples illustrate the manner in which the invention may be carried into effect:

*Example 1*

A block is prepared of a circuit to be printed and mounted on an off-set press having a rubber blanket for transfer. The block is inked with a slurry consisting of 70% by weight of finely divided silver, 20% of triethanolamine alginate and 10% of ethylene glycol. The slurry is transferred in the usual way for off-set printing on to a sheet of polystyrene. The print is now sprinkled with finely divided silver, then with French chalk and brushed with a sable brush. The printed sheet is covered with a sheet of very fine rag paper and inserted in a press, the platen of which is run at 150° C. and the pressure being about 500 lbs./in.$^2$ and pressed for 0.5 second. The sheet is then removed from the press and is washed with water.

*Example 2*

A pattern of a printed circuit is applied to an electrical grade of a phenol-formaldehyde laminate by the silk screen method using a slurry containing 70% by weight of finely divided silver, 5 % of monoethanolamine and 25% of methanol. The print is partially dried by infra-red heating, placed in a press and subjected to a temperature of 210° C. and 1000 lbs./in.$^2$ for 4 seconds. The laminate is removed and washed.

To apply the resistors to this circuit it is printed a second time by the silk screen process the stencil employed having been cut out to leave the resistor areas uncovered and allow slight overlap on to the appropriate portions of the conductors. The slurry used is 20% by weight of carbon black, 5% of glycerine and 75% of methanol. The print is partially dried, placed in the press, covered with a sheet of very fine rag paper and then given the same temperature, pressure and time treatment as previously. The sheet is then taken out of the press and washed.

*Example 3*

A letter press block is prepared of a circuit to be printed and this is mounted on an off-set press, having a rubber blanket for transfer. The block is inked with a slurry consisting of 70% by weight of finely divided silver, 20% of triethanolamine alginate and 10% of ethylene glycol. The slurry is transferred in the usual way for off-set printing on to a sheet of polystyrene. The print is now sprinkled with finely divided silver and dusted with a sable brush which has previously been dipped in French chalk.

The printed sheet is covered with a sheet of very fine rag paper and inserted in a press, the platen of which is heated to 150° C., the pressure being 500 lbs./sq. in. and then pressed for 0.5 second.

*Example 4*

A laminated sheet, identified as "Bakelite E.5089/1", is sprayed with a slurry containing 70% by weight of finely divided silver, 5% of monoethanolamine and 25% of methanol through a stencil giving the pattern of the circuit required. The coating is partially dried by infra red heating and placed in a press. By the application to the whole surface of the laminated sheet of pressure of 1,000 lbs./sq. in. and a temperature of 185° C. for 4 seconds the circuit is bonded to the laminate in the pattern desired.

*Example 5*

In Example 4 instead of applying pressure to the whole surface, a heated die having the shape of the pattern required is pressed, in register, on to the surface of the laminate. Any silver which is not fixed may be removed by washing.

*Example 6*

A silicone laminate is coated with a vinyl chloride copolymer identified as "Bakelite J. 11185" in the areas to which it is desired to apply the resistors. All solvent is allowed to evaporate therefrom so as to produce a non-tacky film of copolymer upon a silicone support. To the copolymer areas there is applied, by means of spraying through a stencil, a slurry consisting of 50% by weight of finely divided carbon, 40% of ethanol and 10% of glycerine.

The laminate is placed in a press and subjected to a temperature of 180° C. and pressure of 1,000 lbs./sq. in. for 10 seconds. It is then transferred to an oven at 150° C. for 10 minutes to completely cure the copolymer.

*Example 7*

An aniline-formaldehyde resin filled with paper fibres is coated with a urea-formaldehyde varnish (20% solids in butanol-toluene mixture) and infra-red heating applied to evaporate off all solvent and to partially cure the urea-formaldehyde condensation product present in the varnish. Through a stencil resistances are sprayed by method described in Example 6. The resistances are dried by infra red heating.

The stencil is removed and a stencil of the required circuit is fitted to the laminate and a circuit sprayed as described in Example 4 and partially dried by infra-red heating.

The laminate is placed in a press, the platen of which is heated to 180° C. and a pressure of 500 lbs./sq. in. applied to the whole laminate for 10 seconds. The laminate with the resistors and circuit produced is placed in an oven for 10 minutes at 150° C. to completely cure the condensation product.

*Example 8*

A pattern of a printed circuit is applied to an electrical grade of a phenol-formaldehyde laminate by the silk screen method using a slurry containing 70% by weight of finely divided silver, 5% of monoethanolamine and 25% of methanol. The print is partially dried by infra-red heating, placed in a press and subjected to a temperature of 210° C. and 1,000 lbs./sq. in. for 4 seconds.

To the circuit thus produced the resistors are applied by spraying firstly the vinyl chloride copolymer of Example 6 in a volatile solvent, drying and spraying a slurry of 30% by weight of carbon, 60% of ethanol and 10% of monoethanolamine through a stencil cut to the pattern of the desired resistances. The laminate is placed in a press and subjected to a pressure of 1,000 lbs./sq. in. and temperature of 180° C. for 10 seconds. The laminate is transferred to an oven and the copolymer completely cured.

*Example 9*

A sheet of silicone treated glass fibre is coated with copolymer as described in Example 6. A slurry of 20% by weight of finely divided carbon, 65% of ethanol and 15% of glycerine, is sprayed through a stencil of the required resistor pattern. The laminate is placed in a press and subjected to a temperature of 180° C. and pressure of 1,000 lbs./sq. in. for ten seconds. The laminate is transferred to an oven and the copolymer cured.

To apply the circuit to these resistors a slurry of 70% by weight of finely divided silver, 5% of monoethanolamine and 25% of methanol is sprayed through a stencil cut in the pattern of the required circuit. The coating is partially dried by infra-red heating and placed in a press. A die, in the circuit pattern desired, heated to 150° C. and accurately registered, is applied under a pressure of 1,000 lbs./sq. in. for 4 seconds. The laminate is then placed in an oven for a further 10 mintues at 150° C. to complete the curing of the copolymer.

We claim:

1. A process for imprinting a circuit element upon a substantially smooth surface of electrical insulating synthetic plastic material, which comprises applying to selected areas of such plastic material, a slurry of finely divided circuit element forming particles in a volatile liquid that is inert to the plastic, and, prior to complete evaporation of the volatile liquid, applying mechanical pressure upon the slurry covered plastic of the order of 500 to 2000 pounds per square inch and heat of the order of 150 to 250° C. for a period of time of the order of 0.5 to 10 seconds, with resultant complete evaporation of the volatile liquid, to thereby secure embedding of the circuit element forming particles in the surface of the plastic material and coherence of such particles without substantially impairing the electrical properties of the surface of said material.

2. The combination recited in claim 1 in which the circuit element forming particles are of silver.

3. The combination recited in claim 1 in which the circuit element forming particles are of carbon black.

4. The combination recited in claim 1 in which the volatile liquid is selected from the group consisting of water, the lower alkanols, the lower cyclic ethers, the lower aliphatic ketones, and mixtures thereof.

5. The combination recited in claim 4 in which the volatile liquid includes a component of lower volatility to retain the solid particles in place on the plastic material prior to application thereto of the bonding pressure and heat, said component of lower volatility being selected from the group consisting of the lower polyhydric alcohols and the amino-alcohols.

6. The combination recited in claim 1 in which two sets of circuit forming elements are applied to the plastic, one set being highly conductive elements composed of metal particles, the other set being resistor elements composed of carbon black particles, and in which continuity of circuit between conductive and resistor elements is maintained by end overlapping of the areas of slurry applied.

7. The combination recited in claim 6 in which the pressure and heat step is performed on the first slurry application before the application of the second slurry.

8. The process recited in claim 1, applied for forming two types of circuit forming elements on the same plastic surface, consisting of a set of conductive elements and a set of resistor elements, in which the slurry of one category of circuit elements is applied in one step and the circuit elements of the other type of circuit elements are applied in a second step, with end overlap of slurry areas for continuity of circuit, and in which the pressure and heat for effecting embedding and cohesion of the respective particles of each category and complete volatilization of the liquid are effected in a single pressure and heat application after both categories of slurry have been applied.

9. The combination recited in claim 1 in which the plastic material is of thermoplastic character of relatively low melting point and in which the mechanical pressure is applied to the slurry covered plastic through an interposed absorbent sheet for effective escape of vapors and protection of the plastic during pressure and heat application.

10. A process for imprinting a circuit element upon a substantially smooth surface of electrical insulating synthetic plastic material which comprises applying to a selected area of said plastic material a slurry of finely divided highly conductive element forming particles in a volatile liquid that is inert to the plastic and a slurry of finely dvided resistor element forming particles in a volatile liquid that is inert to the plastic, portions of the two slurries overlapping to maintain continuity therebetween, and, prior to completion of volatilization of the volatile liquids, simultaneously applying mechanical pressure and heat to the slurry covered plastic to complete volatilization of said volatile liquids and to cause said particles to cohere and to become at least partially embedded in the underlying insulating material without substantially impairing the electrical properties of the surface of said material.

11. The process as claimed in claim 10 in which the pressure and heat are simultaneously applied to the first slurry to complete volatilization of the volatile liquid and to cause the particles in the first slurry to cohere and to become at least partially embedded in the underlying insulating material before the application of the second slurry, and after application of the second slurry the pressure and heat are simultaneously applied to the second slurry to complete volatilization of the volatile liquid and to cause the particles in said second slurry to cohere and to become at least partially embedded in the underlying insulating material.

12. The process as claimed in claim 10 in which the finely divided highly conductive element forming particles are metallic particles, and the resistor element forming particles are carbon black particles.

13. A process for imprinting a circuit element upon a substantially smooth surface of electrical insulating thermoplastic material having a low melting point, which comprises applying to a selected area of said plastic material a slurry of finely divided circuit element forming particles in a volatile liquid that is inert to the plastic, placing an absorbent sheet over said plastic material and applied slurry, and prior to completion of volatilization of the volatile liquid, simultaneously applying mechanical pressure and heat to the absorbent sheet to cause the individual particles to cohere and to become at least partially embedded in the underlying insulating material without substantially impairing the electrical properties of the surface of said material, said interposed absorbent sheet promoting effective escape of vapors and protecting the plastic during the application of pressure and heat.

References Cited in the file of this patent

UNITED STATES PATENTS

| | | |
|---|---|---|
| 122,636 | Muller | Jan. 9, 1872 |
| 1,717,193 | Dantsizen | June 11, 1929 |
| 1,837,678 | Ryder | Dec. 22, 1931 |
| 1,922,254 | McCulloch | Aug. 15, 1933 |
| 1,987,969 | Parkin | Jan. 15, 1935 |
| 2,056,928 | Magdziarz | Oct. 6, 1936 |
| 2,060,114 | Podolsky | Nov. 10, 1936 |
| 2,121,005 | Bener | June 21, 1938 |
| 2,136,370 | Bockius et al. | Nov. 15, 1938 |
| 2,158,552 | Potdevin | May 16, 1939 |
| 2,177,484 | Fruth | Oct. 24, 1939 |
| 2,252,776 | Losee | Aug. 19, 1941 |
| 2,373,676 | Germeshavsen | Apr. 17, 1945 |
| 2,397,827 | Williams | Apr. 2, 1946 |
| 2,429,089 | Box | Oct. 14, 1947 |
| 2,441,960 | Eisler | May 25, 1948 |
| 2,473,183 | Watson | June 14, 1949 |
| 2,474,988 | Sargrove | July 5, 1949 |
| 2,492,429 | John | Dec. 27, 1949 |

FOREIGN PATENTS

| | | |
|---|---|---|
| 269,729 | Great Britain | Apr. 28, 1927 |

OTHER REFERENCES

Printed Circuit Techniques, National Bureau of Standards, Circular 468, 1940, pgs. 12, 13, 14 and 28.